(12) United States Patent
Kepnik

(10) Patent No.: US 10,865,764 B2
(45) Date of Patent: Dec. 15, 2020

(54) FLOW HYDRO TURBINE

(71) Applicant: Goran Kepnik S.P., Jesenice na Dolenjskem (SI)

(72) Inventor: Goran Kepnik, Jesenice na Dolenjskem (SI)

(73) Assignee: Goran Kepnik S.P., Jesenice na Dolenjskem (SI)

(*) Notice: Subject to any disclaimer, the term of this patent is extended or adjusted under 35 U.S.C. 154(b) by 0 days.

(21) Appl. No.: 16/956,849

(22) PCT Filed: Jan. 18, 2019

(86) PCT No.: PCT/SI2019/050001
§ 371 (c)(1),
(2) Date: Jun. 22, 2020

(87) PCT Pub. No.: WO2019/143303
PCT Pub. Date: Jul. 25, 2019

(65) Prior Publication Data
US 2020/0325871 A1    Oct. 15, 2020

(30) Foreign Application Priority Data

Jan. 22, 2018   (SI) .................. P-201700260

(51) Int. Cl.
*F03B 3/00* (2006.01)
*F03B 17/06* (2006.01)
*H02K 7/18* (2006.01)

(52) U.S. Cl.
CPC ............. *F03B 17/062* (2013.01); *F03B 3/00* (2013.01); *H02K 7/1823* (2013.01);
(Continued)

(58) Field of Classification Search
CPC ....... F03B 17/062; F03B 3/00; H02K 7/1823; F05B 2240/13; F05B 2240/24;
(Continued)

(56) References Cited

U.S. PATENT DOCUMENTS 630,482 A    8/1899   Brimer

FOREIGN PATENT DOCUMENTS

DE        383134 C      10/1923
EP        3106655 A1    12/2016
(Continued)

*Primary Examiner* — Aaron R Eastman
(74) *Attorney, Agent, or Firm* — The Watson IP Group, PLC; Jovan N. Jovanovic

(57) ABSTRACT

The hydro turbine of the invention consists of a housing, which represents a stator part of hydro turbine, or a stator (S), and a rotor (R) that is assembled on the stator (S) through its axis so as to enable its rotation. The rotor (R) is designed as an axially symmetric body with flat lateral surfaces with a circular cross-section. The circular cross-section from both outer ends, that is from both flat lateral surfaces with a circular cross-section, decreases equally and continuously towards the middle, so that the rotor (R) has a narrowest cross-section in the middle. The decrease of the circular cross-section from both outer ends of the rotor (R) towards the central part of the rotor (R) is carried out such that the shape of the rotor (R) body in the longitudinal cross-section, that is, along the axis of the rotor (R), follows the shape of a parabolic curve or a sinusoidal curve. The rotor (R) has over its entire surface, in the longitudinal direction, that is along its axis, curved grooves (U). This kind of design of the hydro turbine enables that the water flows through the grooves (U) towards the middle part of the rotor (R), where it flows out and transfers all the momentum to the rotor (R), so that the hydro turbine can generate the torque (MR) even with small and variable flows.

7 Claims, 5 Drawing Sheets

(52) U.S. Cl.
 CPC ....... *F05B 2240/13* (2013.01); *F05B 2240/24* (2013.01); *F05B 2250/16* (2013.01); *F05B 2250/184* (2013.01)

(58) Field of Classification Search
 CPC ............ F05B 2250/16; F05B 2250/184; F01D 1/024; F01D 1/026
 See application file for complete search history.

(56) References Cited

FOREIGN PATENT DOCUMENTS

| | | | |
|---|---|---|---|
| FR | 2696789 | A3 | 4/1994 |
| JP | S56146072 | A | 11/1981 |
| WO | 2014029760 | A1 | 2/2014 | a) b)

a) b)

FLOW HYDRO TURBINE

The subject of this invention is a hydro turbine as the energy converter that transforms hydro potential energy of fluid, mostly water, into the useful (deployable) mechanical energy through rotation of a specially constructed rotor.

The technical problem which is solved through this invention is enabling efficient functioning and generating of the torque $M_R$ on the hydro turbine rotor, when the flow of fluid, mostly water, is small and variable.

The existing constructions of the flow hydro turbines do not generate satisfactory efficiency when the water flow is small and variable. These shortcomings are solved with this flow hydro turbine in accordance with the invention, as described below and presented in the figures showing the following:

Figure 6:
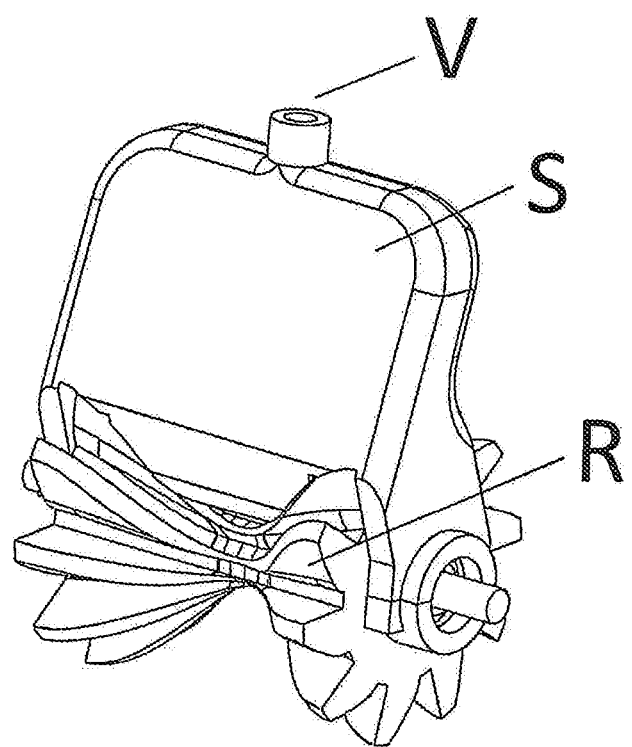
Figure 7:
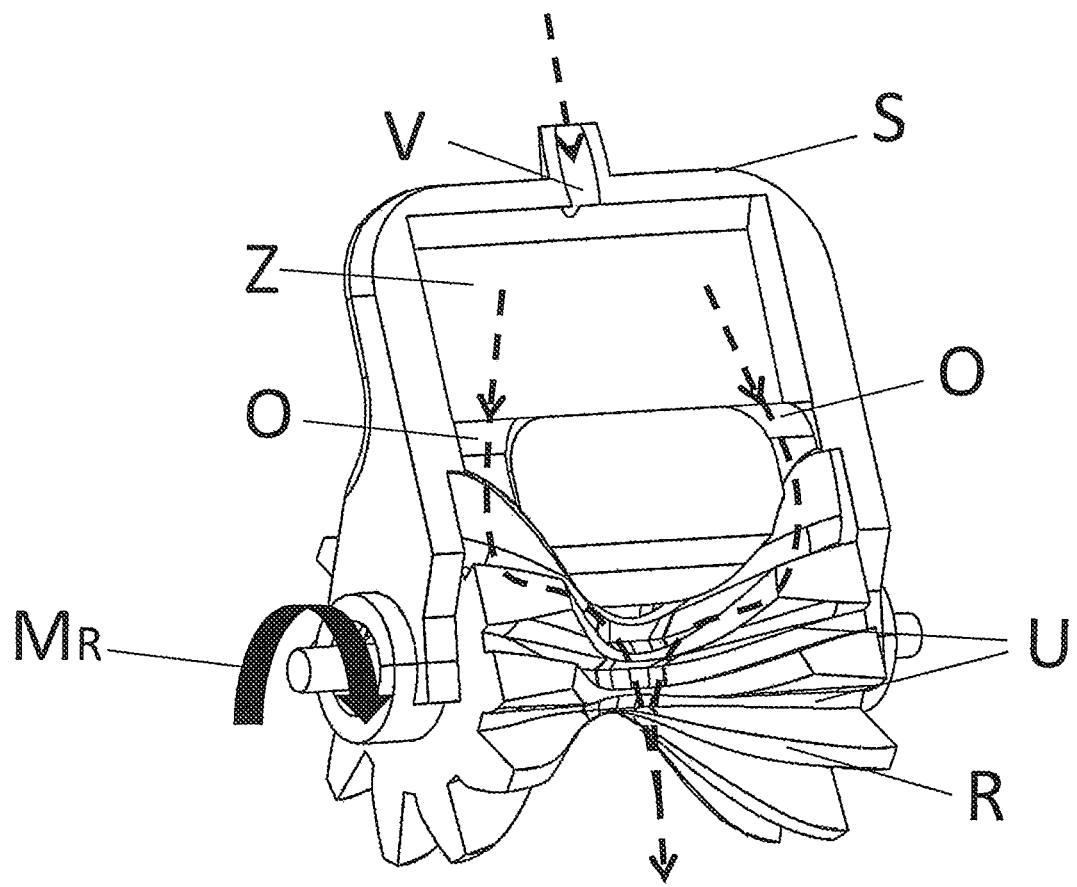

FIGS. 3a and 3b show one example of the flow hydro turbine in accordance with the invention using two sections with marked flow of water—open construction design FIGS. 4a and 4b show one example of the flow hydro turbine in accordance with the invention using two sections with marked flow of water—closed construction design FIGS. 5a and 5b show another example of the rotor of the flow hydro turbine in accordance with the invention—front, side and isometric views;

FIGS. 5c and 5d show another example of the stator of the flow hydro turbine in accordance with the invention—front and isometric views;

FIG. 6 shows another example of the flow hydro turbine in accordance with the invention FIG. 7 shows another example of the flow hydro turbine in accordance with the invention with the marked water flow.

According to the invention, the turbine consists of a housing, which represents a stator part of hydro turbine, or a stator S, and a rotor R, which is rotatably mounted in the stator (S) via an axis. The rotor R is designed as an axially symmetric body with flat lateral surfaces with a circular cross-section. The circular cross-section from both outer ends, i.e. from both flat lateral surfaces with the circular cross-section, decreases equally and continuously towards the middle, so that the rotor R has in the middle the narrowest cross-section and therefore cross-section of the rotor R is the narrowest at this point. The decrease of the circular cross-section from both outer ends of the rotor R towards the middle of the rotor R is arbitrary, and is preferably made in a way that the shape of the rotor R body in a longitudinal cross-section, i.e. along the axis of the rotor R, follows the shape of a parabolic or a sinusoidal curve. Throughout its entire surface, in the longitudinal direction, the rotor R has grooves U. The grooves U are equally spaced one from another and they are made in form of a curve, which means that they are not parallel to the axis of the rotor R, but they are carved into the surface of the rotor R in a form of a curve. The grooves U are made in such a way that the cross-section of the groove U in the portion located on an outer rim of the rotor R is wider and gradually narrows into the interior. In this way, it is possible to direct as much water as possible into the grooves U and thus along the grooves U towards the central part of the rotor R. The form of curve, that is the curvature of the groove U, may be arbitrary and can be specified in each case on the basis of the inlet hydrodynamic parameters of the water flowing into the hydro turbine, in a way that the hydro turbine works with the highest possible efficiency in a wider working range in relation to the water flow through the hydro turbine and rotational speed of the rotor R.

The rotor R is rotatably mounted in the stator S via its axis, that is into the housing. For mounting the rotor R into the stator S, the stator S or the housing in a part in which the rotor R is mounted, is made with an appropriate cut-out, that is, a hole, the dimensions and shape of the cut-out being defined such that there is a clearance between the rotor R and the stator S when they are assembled together, enabling the rotor R to freely rotate when the water flows onto it. Mounting of the rotor R into the cut-out of the stator S is performed in well-known ways that enable the rotation of the rotor R, for example through the bearings. In addition to the cut-out, in which the rotor R is mounted, inside the stator S there is also a collector Z which is separated from the cut-out in which the rotor R is mounted, where the water is collected and flows into the grooves U of the rotor R through the openings O located at the bottom of the collector Z. The collector Z enables continuous and uniform inflow of water onto the rotor R even when the inflow of water into the hydro turbine does not have equal intensity. The stator S has the extension for a pipe connection V for water inflow into the hydro turbine. The openings O are positioned in such a way that the water from the collector Z flows onto both ends of the rotor R, that is, the water flows to the parts of the rotor R, which are the furthest from the central part of rotor R.

The operation of the hydro turbine may be in one embodiment carried out either in an open or closed construction design. The open construction design means that the rotor R rotates in the direction that the water from the rotor R flows out of the housing through the cut-out, and the closed construction design means that the rotor R rotates in the direction that the water from the rotor R flows into the housing and then out of the housing through an additionally constructed extension for the output pipe connection CV. The operation of the hydro turbine may be adapted from one construction design to another, if the rotor R is simply turned around by 180°, thereby reversing the rotation direction of the rotor R thereby diverting the flow of water leaving the rotor R.

This kind of design of the hydro turbine enables that the water flows through the grooves U towards the middle part of the rotor R, where it flows out and transfers all the momentum to the rotor R, so that the hydro turbine can generate the torque $M_R$ even with small and variable flows.

Below the embodiments of the construction design and functioning of the flow hydro turbine in accordance with the invention are described.

Figure 1:
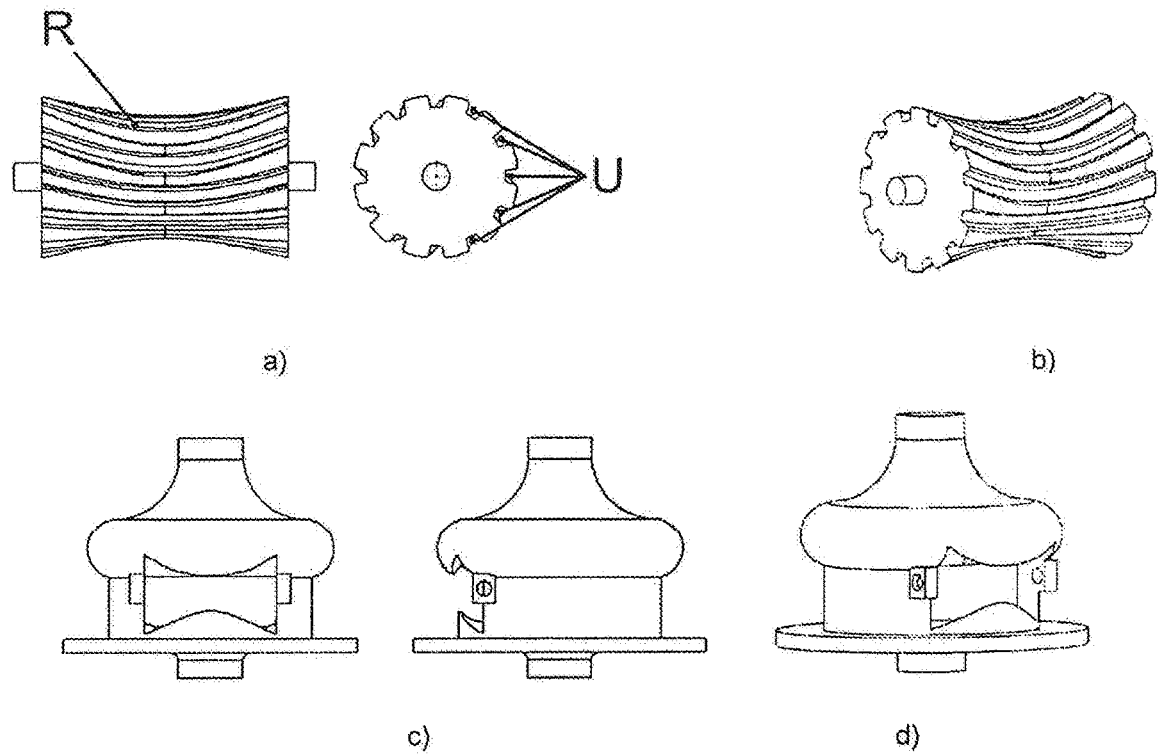
FIGS. 1a and 1b show an example of a rotor of the flow hydro turbine in accordance with the invention—front, side and isometric views.
FIGS. 1c and 1d show an example of a stator of the flow hydro turbine in accordance with the invention—front, side and isometric views.
Figure 2:
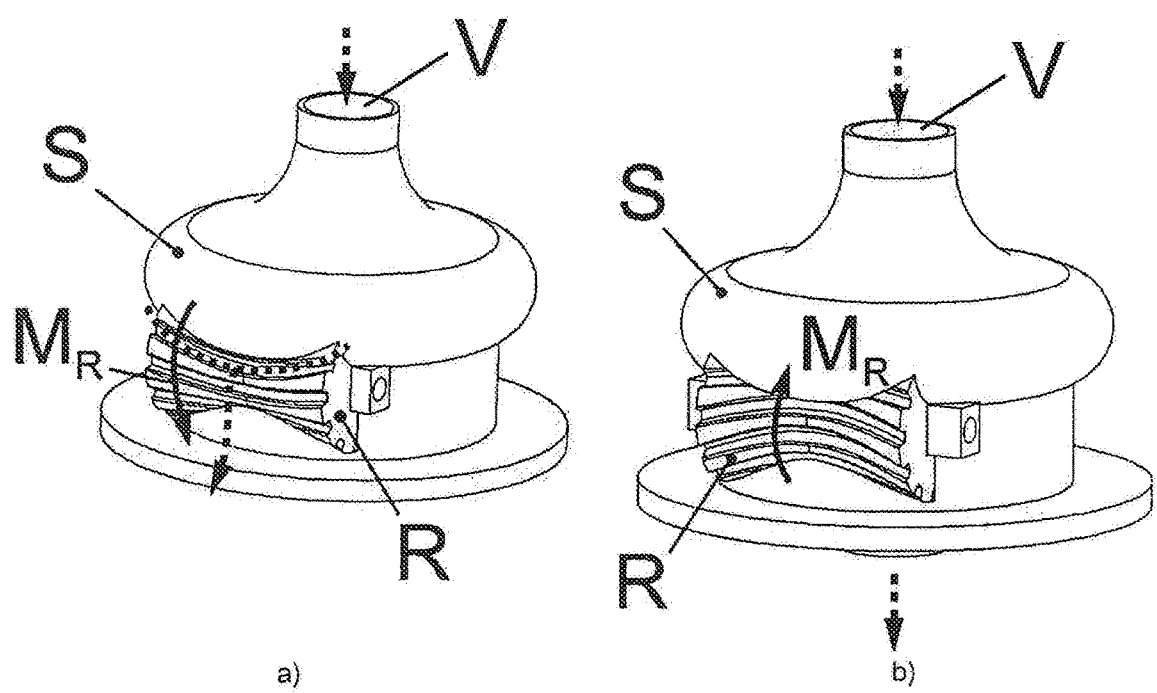
FIG. 2a shows an example of the flow hydro turbine in accordance with the invention—open construction design.
FIG. 2b shows an example of the flow hydro turbine in accordance with the invention—closed construction design.

One embodiment shown in FIGS. 1 to 4, presents the flow hydro turbine constructed from a stator S, shown in FIGS. 1c and 1d, and a rotor R, shown in FIGS. 1a and 1b. The rotor R is designed as an axially symmetric body with flat lateral surfaces with a circular cross-section. The circular cross-section from both outer ends, i.e. from both flat lateral surfaces with the circular cross-section, decreases equally and continuously towards the middle. The shape of the rotor R body in the longitudinal cross-section, that is, along the axis of the rotor R, follows the shape of a parabolic curve. The rotor R has throughout its entire surface, in the longitudinal direction, curved grooves U, which are equally spaced one from another. The grooves U are made in the form of an isosceles trapezoid, so that the cross-section of the groove U in the part located on the outer rim of the rotor R is wider, and then it gradually narrows into the interior.

Figure 3:
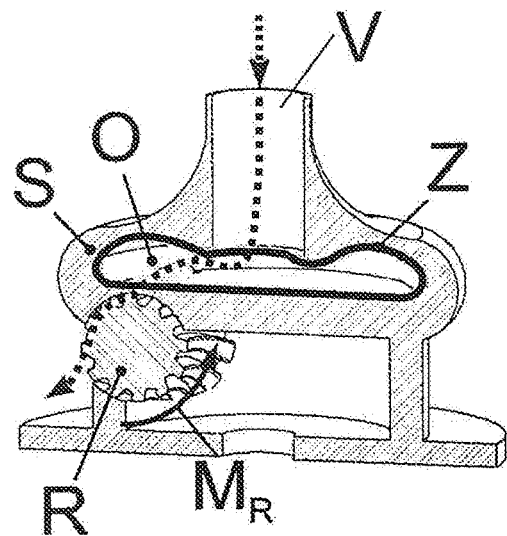
Figure 3:
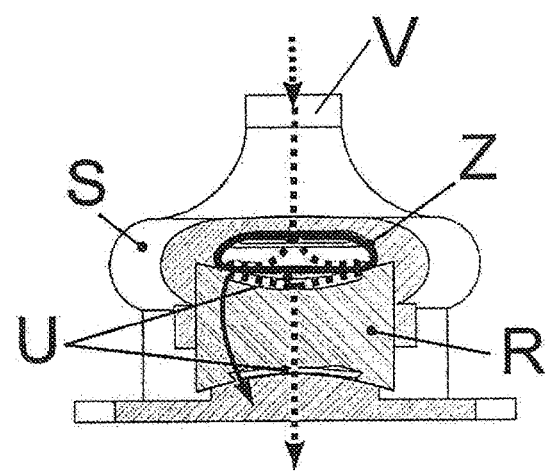
Figure 4:
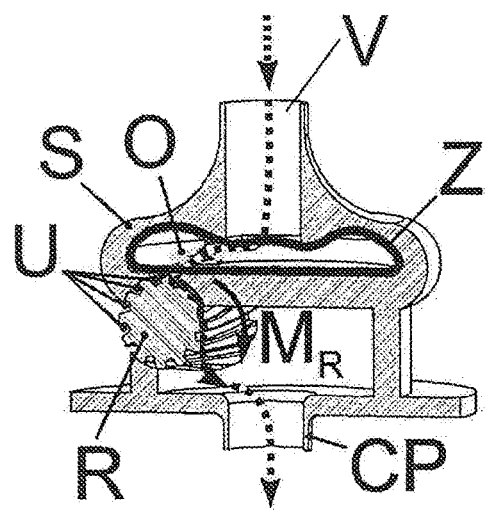
Figure 4:
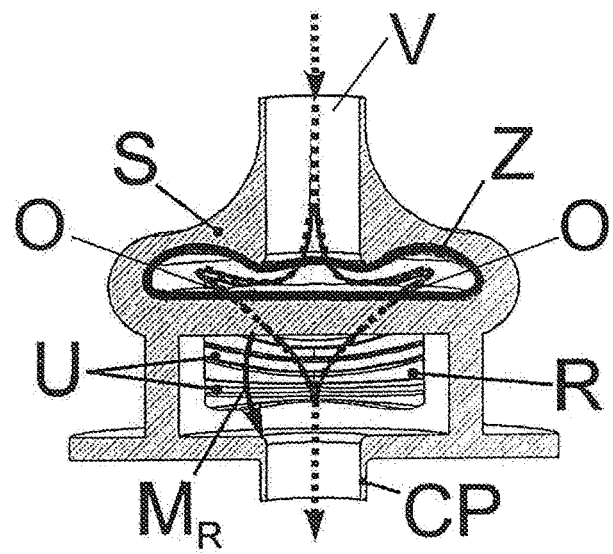

In said embodiment, the flow hydro turbine may be carried out in the open construction design, as shown in FIGS. 3a and 3b or in the closed construction design, as shown in FIGS. 4a and 4b. FIGS. 3a and 4a show a cross-section of the hydro turbine in a plane perpendicular to the axis of the rotor R, while FIGS. 3b and 4b show a cross-section of the hydro turbine in a plane parallel to the axis of rotation of the rotor R. Water flows into the hydro turbine first into the collector Z and through the openings O on to the rotor R. Because the clearance between the rotor R and the stator S is just sufficient enough to enable smooth rotation of the rotor R of the hydro turbine, the water can flow only along the curved and cut grooves U of the rotor R, leading the water to the lowest point, located at the narrowed central part of the rotor R. At such a flow, water transfers its momentum to the rotor R, which is the reason why the rotor R gains its angular velocity, that is, the rotor R rotates and the torque $M_R$ is generated. The flow of water through the hydro turbine is marked as a dashed line in FIGS. 3 and 4 for both construction designs. Because in the closed construction design water flows out of the grooves U of the rotor R into the inside the hydro turbine, the stator S has on the lower side of the housing a pipe connection CP, which is not the case with the open construction design of the hydro turbine, where the water from the grooves U of the rotor R flows out of housing through the cut-out on the stator S.

Figure 5:
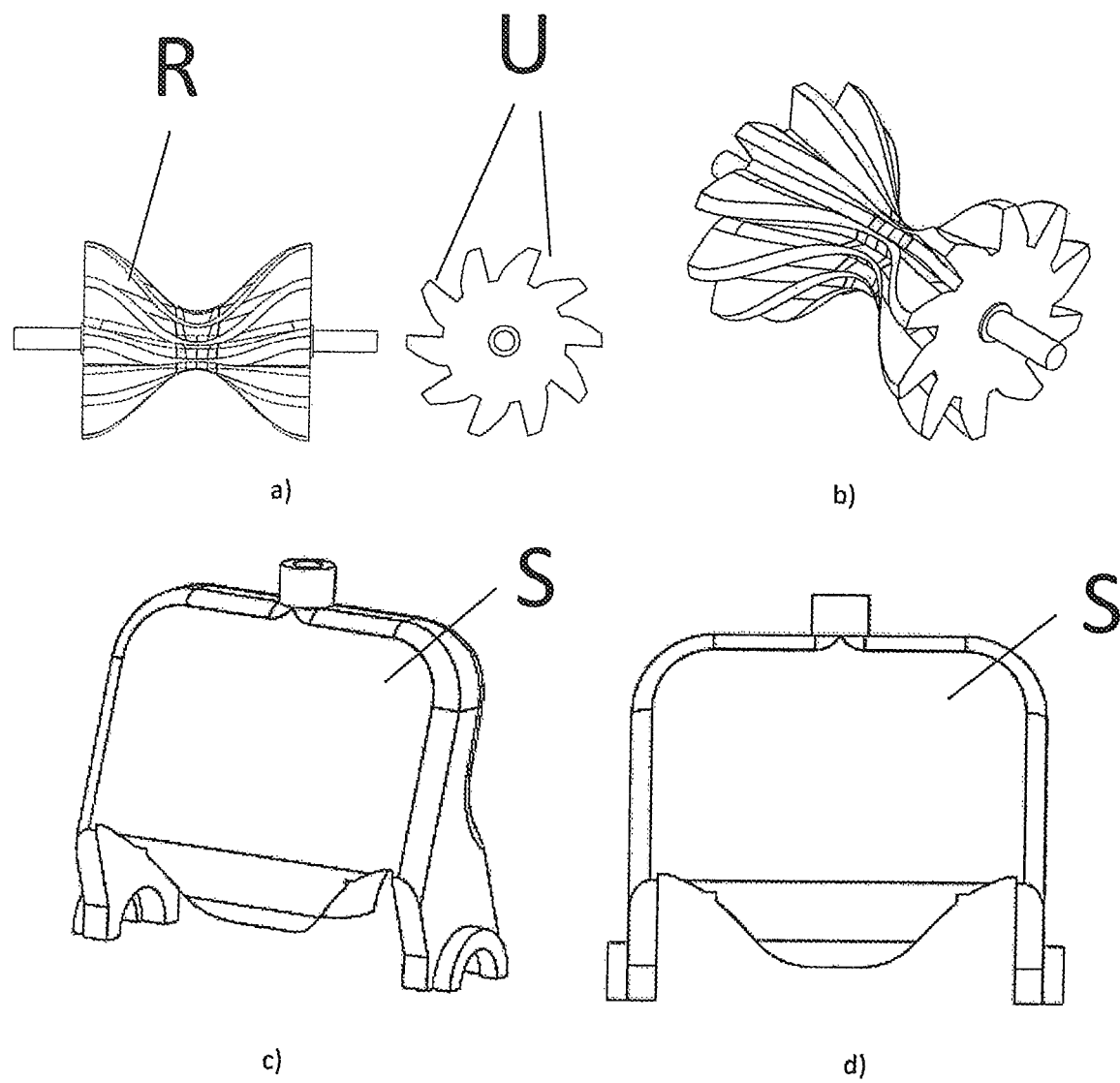

In another embodiment, which is shown in FIGS. 5 to 7, the hydro turbine is constructed from a stator S shown in FIGS. 5c and 5d and a rotor R shown in FIGS. 5a and 5b. The rotor R is designed as an axially symmetric body with flat lateral surfaces with a circular cross-section. The circular cross-section from both outer ends, i.e. from both flat lateral surfaces with the circular cross-section, decreases equally and continuously towards the middle. The shape of the rotor R body in the longitudinal cross-section, that is, along the axis of the rotor R, follows the shape of a sinusoid curve. The rotor R has throughout its entire surface, in the longitudinal direction, curved grooves U, which are equally spaced one from another, wherein the grooves U being constructed such that the cross-section of the groove U in the part located on the outer rim of the rotor R is wider, and then it gradually narrows into the interior.

Operation of the hydro turbine is shown in FIG. 7. Water flows into the hydro turbine first into the collector Z and then through the openings O on the rotor R. Because the clearance between the rotor R and the stator S is just sufficient enough to enable smooth rotation of the rotor R of the hydro turbine, the water can flow only along the curved and cut grooves U of the rotor R, leading the water to the lowest point, located at the narrowed central part of the rotor R. At such a flow, water transfers its momentum to the rotor R, which is the reason why the rotor R gains its angular velocity, that is, the rotor R rotates and the torque $M_R$ is generated. The flow of water through the hydro turbine is marked as a dashed line in FIG. 7.

If a generator is attached to the axis of the rotor R of the hydro turbine, the hydro turbine can be used for the production of electricity. During hydro turbine operation, the hydro turbine does not adversely affect the environment and does not emit any by-products, therefore the hydro turbine is actually an environmentally friendly and renewable source of energy.

The invention claimed is:

1. A flow hydro turbine comprising of a rotor (R) and a stator (S), wherein the rotor (R) is rotatably mounted in the stator (S) via an axis, characterized in that, the rotor (R) is constructed as an axially symmetric body with flat lateral surfaces with a circular cross-section, wherein the circular cross-section from both outer ends, that is from both flat lateral surfaces with a circular cross-section, decreases equally and continuously towards the middle, so that the rotor (R) has a narrowest cross-section in the middle, and the rotor (R) has over its entire surface, in the longitudinal direction, that is along its axis, curved grooves (U).

2. The flow hydro turbine according to claim 1, characterized in that, the decrease of the circular cross-section from both outer ends of the rotor (R) towards the central part of the rotor (R) is carried out such that the shape of the rotor (R) body in the longitudinal cross-section, that is, along the axis of the rotor (R), follows the shape of a parabolic curve or a sinusoidal curve.

3. The flow hydro turbine according to claim 1, characterized in that, the grooves (U) are equally spaced one from another and are curved, and are carved into the surface of the rotor (R) in a form of a curve.

4. The flow hydro turbine according to claim 1, characterized in that, the grooves (U) are constructed in such a way, that the cross-section of the groove (U), in the portion located on an outer rim of the rotor (R), is wider, and gradually narrows into the interior.

5. The flow hydro turbine according to claim 1, characterized in that, the stator (S), in a part in which the rotor (R) is mounted, is made with a cut-out, wherein dimensions and shape of the cut-out being defined such that there is a clearance between the rotor (R) and the stator (S) when they are assembled together.

6. The flow hydro turbine according to claim 1, characterized in that, inside the stator (S) there is a collector (Z) which is separated from the cut-out in which the rotor (R) is mounted, where the water is collected and flows into the grooves (U) of the rotor (R) through openings (O), located at a bottom of the collector (Z), and the stator (S) has an extension for a pipe connection (V) for water inflow into the hydro turbine and optionally an extension for an output pipe connection (CV).

7. The flow hydro turbine according to claim 6, characterized in that, the openings (O) are positioned in a way that water from the collector (Z) flows onto both ends of the rotor (R), that is to parts of the rotor (R), which are the furthest from the central part of the rotor (R).

* * * * *